United States Patent
Kiyoto

(10) Patent No.: US 10,101,861 B2
(45) Date of Patent: Oct. 16, 2018

(54) TOUCH PANEL MODULE AND ELECTRONIC APPARATUS

(71) Applicant: FUJIFILM Corporation, Tokyo (JP)

(72) Inventor: Naoharu Kiyoto, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 139 days.

(21) Appl. No.: 15/234,205

(22) Filed: Aug. 11, 2016

(65) Prior Publication Data

US 2016/0349883 A1    Dec. 1, 2016

Related U.S. Application Data

(63) Continuation of application No. PCT/JP2015/052951, filed on Feb. 3, 2015.

(30) Foreign Application Priority Data

Mar. 25, 2014  (JP) ................................ 2014-061317

(51) Int. Cl.
 *G06F 3/044*         (2006.01)
(52) U.S. Cl.
 CPC .... *G06F 3/044* (2013.01); *G06F 2203/04112* (2013.01)
(58) Field of Classification Search
 CPC ................. G06F 2203/04112; G06F 3/044
 USPC .................................................. 345/170–176
 See application file for complete search history.

(56) References Cited

U.S. PATENT DOCUMENTS

| | | | | |
|---|---|---|---|---|
| 6,020,945 A | * | 2/2000 | Sawai | G02F 1/13338 345/104 |
| RE43,924 E | * | 1/2013 | Sawai | G02F 1/13338 345/104 |
| 2008/0143928 A1 | | 6/2008 | Fukagawa | |
| 2010/0020045 A1 | * | 1/2010 | Walsh | G06F 3/0412 345/176 |
| 2012/0062504 A1 | * | 3/2012 | Kim | G06F 3/044 345/174 |
| 2013/0194205 A1 | | 8/2013 | Park et al. | |

(Continued)

FOREIGN PATENT DOCUMENTS

| | | |
|---|---|---|
| EP | 1 081 633 A2 | 3/2001 |
| JP | 10-48625 A | 2/1998 |

(Continued)

OTHER PUBLICATIONS

Japanese Office Action dated Mar. 7, 2017 issued in the corresponding Japanese Patent Application No. 2014-061317 with an English Translation.

(Continued)

*Primary Examiner* — Tony Davis
(74) *Attorney, Agent, or Firm* — Birch, Stewart, Kolasch & Birch, LLP

(57) ABSTRACT

A touch panel module in which a conductive film in which a mesh conductive layer composed of a mesh-like metal electrode is formed on a support, a $\lambda/4$ plate, a polarizing plate, and a protective layer are arranged in this order. A $\lambda/4$ plate is further arranged on a side of the conductive film opposite to the protective layer. The touch panel module has a visible light diffuse reflectivity of 2% or less, which is measured from the protective layer.

17 Claims, 5 Drawing Sheets

(56) References Cited

U.S. PATENT DOCUMENTS

| | | | | |
|---|---|---|---|---|
| 2013/0293096 A1* | 11/2013 | Kang | ................. | H01H 1/10 |
| | | | | 313/511 |
| 2014/0098420 A1* | 4/2014 | Chung | ................. | G02B 27/286 |
| | | | | 359/489.07 |
| 2015/0355490 A1* | 12/2015 | Kao | ................. | G02F 1/133502 |
| | | | | 349/12 |
| 2016/0062509 A1* | 3/2016 | Toyoshima | ......... | G02F 1/13338 |
| | | | | 345/174 |
| 2016/0070382 A1* | 3/2016 | Toyoshima | ............ | G06F 3/044 |
| | | | | 349/12 |
| 2016/0070383 A1* | 3/2016 | Toyoshima | .......... | H01L 27/323 |
| | | | | 345/174 |
| 2016/0085100 A1* | 3/2016 | Toyoshima | .......... | H01L 27/323 |
| | | | | 349/12 |
| 2016/0092005 A1* | 3/2016 | Toyoshima | .......... | H01L 27/323 |
| | | | | 345/174 |
| 2016/0320885 A1* | 11/2016 | Kim | ................. | G06F 3/0412 |
| 2017/0123570 A1* | 5/2017 | Maruyama | ............ | G06F 3/0416 |

FOREIGN PATENT DOCUMENTS

| | | |
|---|---|---|
| JP | 2001-75731 A | 3/2001 |
| JP | 2007-272259 A | 10/2007 |
| JP | 2008-529038 A | 7/2008 |
| JP | 2012-219155 A | 11/2012 |
| JP | 2013-92632 A | 5/2013 |
| JP | 2013-156975 A | 8/2013 |
| JP | 2013-246723 A | 12/2013 |
| WO | WO 2005/098585 A1 | 10/2005 |
| WO | WO 2014/010270 A1 | 1/2014 |

OTHER PUBLICATIONS

Japanese Office Action and English translation thereof, dated Aug. 30, 2016, for corresponding Japanese Application No. 2014-061317.
International Search Report, issued in PCT/JP2015/052951, dated Apr. 7, 2015.
Written Opinion of the International Searching Authority, issued in PCT/JP2015/052951 (PCT/ISA/237), dated Apr. 7, 2015.
International Preliminary Report on Patentability and translation of the Written Opinion of the International Searching Authority (Forms PCT/IB/338, PCT/IB/373 and PCT/ISA/237) for International Application No. PCT/JP2015/052951, dated Oct. 6, 2016.
Taiwanese Office Action and Search Report dated Feb. 26, 2018 for corresponding Taiwanese Application No. 104105203, with partial translation of the Office Action.

\* cited by examiner

TOUCH PANEL MODULE AND ELECTRONIC APPARATUS

CROSS-REFERENCE TO RELATED APPLICATIONS

This application is a Continuation of PCT International Application No. PCT/JP2015/052951 filed on Feb. 3, 2015, which claims priority under 35 U.S.C. § 119(a) to Japanese Patent Application No. 2014-061317 filed on Mar. 25, 2014. The above application is hereby expressly incorporated by reference, in its entirety, into the present application.

BACKGROUND OF THE INVENTION

1. Field of the Invention

The present invention relates to a touch panel module having a mesh-like metal electrode, and an electronic apparatus having a touch panel module, and particularly relates to a touch panel module having low visibility of wiring such as a mesh-like metal electrode, and an electronic apparatus.

2. Description of the Related Art

In recent years, as an input device for an electronic apparatus such as a portable terminal or a computer, a touch panel has been frequently used. A touch panel is arranged on the surface of a display and detects a position touched with a finger or the like to conduct an input operation. As a position detecting method for a touch panel, for example, a resistance film type, an electrostatic capacitive type, and the like are known.

As a representative method for a touch panel, a method of using a transparent conductive material such as indium tin oxide (ITO), or a method of using a mesh-like metal electrode may be used. However, a transparent conductive material such as ITO has high electrical resistance and is not suitable for a large screen touch panel. In addition, the resistance in the method of using a mesh-like metal electrode is lower than in the case of using a transparent conductive material such as ITO, and thus the method of using a mesh-like metal electrode is suitable for a large screen touch panel. However, the visibility of the mesh-like metal electrode, so-called line visibility occurs, or a screen contrast is lowered and thus there arises a problem in that the image quality becomes poor compared to the case of using the method of using a transparent conductive material such as ITO.

In JP2013-92632A, a display device in which a touch panel having a transparent conductive film between a display device body and a circularly polarizing plate is arranged is disclosed. The circularly polarizing plate is configured by laminating a front reflection suppression layer, a polarizer, and a λ/4 plate in this order from the visible side, and the λ/4 plate of the circularly polarizing plate is arranged on the touch panel. In JP2013-92632A, a front surface reflectivity (R0), which is defined as a reflectivity of light incident in a direction of 5° with respect to a line normal to the surface of the display device on the visible side in the display device, satisfies the following expression.

$$0\% \leq |R0(\lambda 1) - R0(\lambda 2)| \leq 0.5\%$$

In the expression, $\lambda 1$ and $\lambda 2$ each represent different wavelengths selected from 480 nm, 550 nm, and 650 nm, and $R0(\lambda 1)$ and $R0(\lambda 2)$ each represent a front reflectivity of light having a wavelength $\lambda 1$ or a wavelength $\lambda 2$.

SUMMARY OF THE INVENTION

In JP2013-92632A, suppression of external light reflection and tint generation is taken into consideration. In addition, in JP2013-92632A, it is pointed out that since the touch panel has a transparent conductive film having a high refractive index, the reflectivity at the interface thereof is high and external light reflection is a problem. However, in the case of using a transparent conductive material such as ITO, since the material is transparent, the visibility of the electrode is not a problem. On the other hand, in the case of using a mesh-like metal electrode, since metal reflects light, the visibility of the mesh-like metal electrode is not taken into any consideration. In the case of using a mesh-like metal electrode, it is required that the mesh-like metal electrode is made hardly visible.

An object of the present invention is to solve the aforementioned problems based on the related art and to provide a touch panel module having low visibility of wiring such as a mesh-like metal electrode and an electronic apparatus.

In order to achieve the above object, according to a first aspect of the present invention, there is provided a touch panel module wherein a conductive film in which a mesh conductive layer composed of a mesh-like metal electrode is formed on a support, a λ/4 plate, a polarizing plate, and a protective layer are arranged in this order, a λ/4 plate is further arranged on a side of the conductive film opposite to the protective layer, and a visible light diffuse reflectivity thereof measured from the protective layer is 0.2% or less.

In the touch panel module, it is preferable that L* of a surface of the protective layer is 2 or less.

In addition, it is preferable that an equilibrium moisture content of the λ/4 plate is 2% or less.

Further, it is preferable that the support has a retardation value of 40 nm or less at a wavelength of 550 nm in an in-plane direction and it is more preferable that the support has a retardation value of 20 nm or less.

According to a second aspect of the present invention, there is provided an electronic apparatus comprising: the touch panel module according to the aspects of the present invention.

According to a third aspect of the present invention, there is provided an electronic apparatus wherein the touch panel module according to the aspects of the present invention is arranged on a liquid crystal display portion.

According to the present invention, it is possible to obtain a touch panel module having low visibility of wiring such as a mesh-like metal electrode, and an electronic apparatus. In addition, since the resistance of the mesh-like metal electrode is lower than that of a transparent conductive material such as ITO, it is possible to obtain a touch panel module having low resistance and an electronic apparatus.

DESCRIPTION OF THE PREFERRED EMBODIMENTS

Hereinafter, a touch panel module and an electronic apparatus of the present invention will be described in detail based on preferred embodiments shown in the attached drawings.

As a result of intensive investigations on a touch panel module and an electronic apparatus, the present inventors have found that in order to make wiring such as a mesh-like metal electrode of a conductive film hardly visible, that is, in order to reduce line visibility, it is known that it is effective to reduce a visible light diffuse reflectivity, and when the visible light diffuse reflectivity is 0.2% or less, line visibility can be suppressed. The present invention has been accomplished based on the above findings.

Hereinafter, a touch panel module and an electronic apparatus will be described in detail.

Figure 1A:
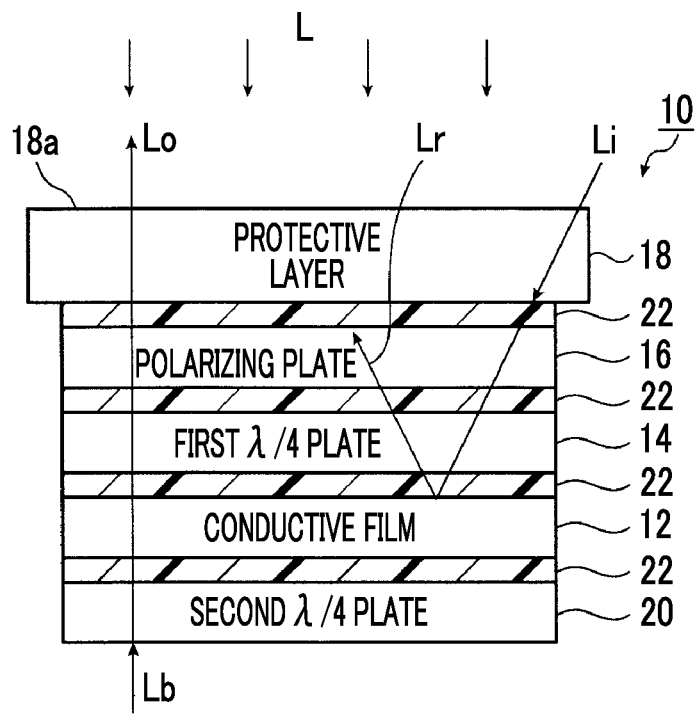
FIG. 1A is a schematic view showing the configuration of a touch panel module according to an embodiment of the present invention and FIG. 1B is a schematic view showing an electronic apparatus according to an embodiment of the present invention.
Figure 1B:
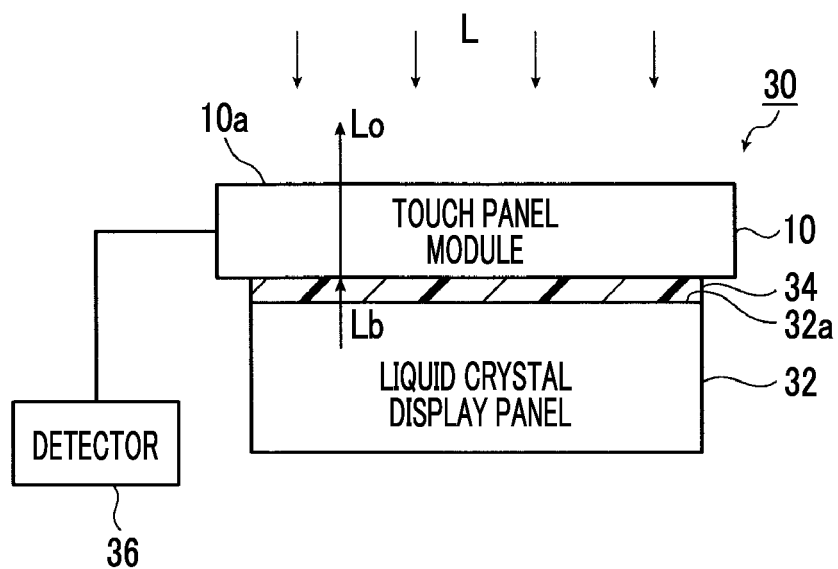
Figure 2A:
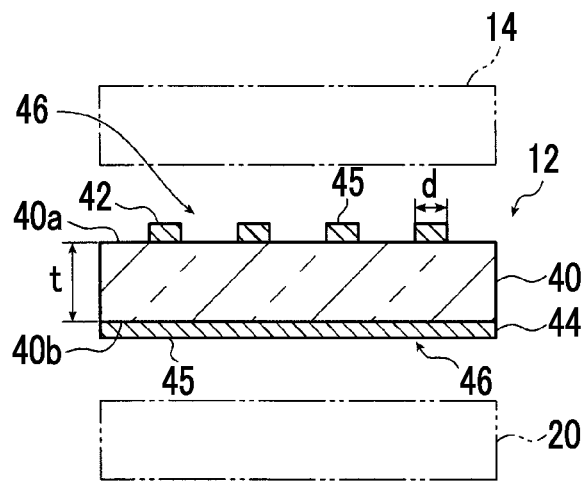
FIG. 2A is a schematic cross-sectional view showing an example of a conductive film.
Figure 2B:
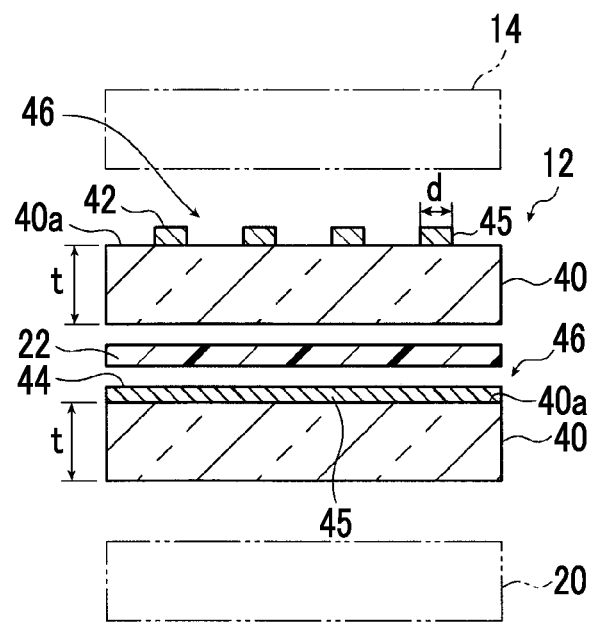
FIG. 2B is a schematic cross-sectional view showing another example of the conductive film.

FIG. 1A is a schematic view showing the configuration of a touch panel module according to an embodiment of the present invention and FIG. 1B is a schematic view showing an electronic apparatus according to an embodiment of the present invention. FIG. 2A is a schematic cross-sectional view showing an example of a conductive film, and FIG. 2B is a schematic cross-sectional view showing another example of the conductive film.

A touch panel module 10 shown in FIG. 1A has a conductive film 12, a first λ/4 plate 14, a polarizing plate 16, and a protective layer 18 arranged in this order through optically transparent layers 22. Further, a second λ/4 plate 20 is arranged on the side of the conductive film 12 opposite to the protective layer 18 through the optically transparent layer 22. The conductive film 12 corresponds to a touch sensor portion and although described later, a mesh conductive layer composed of a mesh-like metal electrode is formed on a support.

For example, light obtained from sunlight L which is incident to a surface 18a of the protective layer 18 and is reflected by the conductive film 12 in the touch panel module 10, is observed by a user of an electronic apparatus from the surface 18a of the protective layer 18. Hereinafter, the surface 18a of the protective layer 18 to be observed in the touch panel module 10 is simply referred to as "observation side".

In the touch panel module 10, due to the above reason, the visible light diffuse reflectivity measured from the protective layer 18 is set to 0.2% or less. Thus, the mesh-like metal electrode of the conductive film 12 is made hardly visible. In the case in which the visible light diffuse reflectivity exceeds 0.2%, the visibility of the mesh-like metal electrode increases and the mesh-like metal electrode is likely to become visible.

The present inventors have found that the visible light diffuse reflectivity can be reduced by providing the first λ/4 plate 14 and the polarizing plate 16 on the conductive film 12 in this order in the touch panel module 10, and adopted such a configuration.

Here, the visible light diffuse reflectivity refers to a value obtained by measuring a diffuse reflectivity at 380 nm to 780 nm, multiplying the measured diffuse reflectivity and the high price coefficient in Table 1.1 (high price coefficient for calculating visible light transmittance) of JIS A 5759:2008, and applying weighted averaging to the obtained value.

A physical value which is in the almost the same relationship as in the visible light diffuse reflectivity is L*, and reducing the value of this L* is also effective to suppress line visibility. In the present invention, it is preferable that L* of the surface 18a of the protective layer 18 is 2 or less.

Here, L* of the present invention refers to a value of L* in a color space according to CIE 1976 L*a*b*.

The measurement method of the value of L* is not particularly limited as long as the value of L* the above-described color space according to CIE 1976 L*a*b* can be measured. For example, the value can be measured using a spectrophotometer. For example, the value can be measured using a spectrophotometer SPECTROEYE (product name, manufactured by SAKATA INX ENG. CO., LTD.).

The touch panel module 10 has a configuration in which the protective layer 18/the polarizing plate 16/the first λ/4 plate 14/the conductive film 12/the second λ/4 plate 20 are laminated in this order through the optically transparent layers 22. The visible light diffuse reflectivity measured from the protective layer 18 can be set to 0.2% or less and L* of the surface 18a of the protective layer 18 can be set to 2 or less.

Hereinafter, each configuration of the touch panel module 10 will be described.

The first λ/4 plate 14 and the second λ/4 plate 20 has the same configuration and any of these plates imparts a phase difference of π/2(90°). By providing the first λ/4 plate 14 and the second λ/4 plate 20, linearly polarized light can be changed to elliptically polarized light or circularly polarized light, or elliptically polarized light or circularly polarized light can be changed to linearly polarized light. The first λ/4 plate 14 and the second λ/4 plate 20 are not particularly limited as long as the above-described function can be exhibited and known plates can be used.

The first λ/4 plate 14 and the second λ/4 plate 20 are formed of, for example, a polycarbonate (PC) substrate, a triacetylcellulose (TAC) substrate, a cycloolefin polymer (COP) substrate or the like.

Here, when the mesh conductive layer and the λ/4 plate are laminated and used as a touch panel module, it is found that the insulation resistance may decrease with time in some cases. This is because the mesh-like metal electrode of the mesh conductive layer causes migration. The migration remarkably occurs at a position near the λ/4 plate and is caused by a high moisture content and easy water absorption of the λ/4 plate. In order to solve these problems, it is important to reduce the moisture content of the λ/4 plate. In order to suppress migration, it is preferable that the equilibrium moisture content of the first λ/4 plate 14 and the second λ/4 plate 20 is 2% or less.

The first λ/4 plate 14 and the second λ/4 plate 20 are configured to have a low equilibrium moisture content and thus the equilibrium moisture content can be reduced. For example, by using a polycarbonate substrate or a COP substrate for the first λ/4 plate 14 and the second λ/4 plate 20, the equilibrium moisture content can be reduced.

The equilibrium moisture content of the first λ/4 plate 14 and the second λ/4 plate 20 can be measured by using the Karl-Fischer method.

The polarizing plate 16 imparts polarization to light which enters the touch panel module 10. The light reflected by the conductive film 12 does not passes through the polarizing plate 16 since the polarization direction is perpendicular to the polarizing plate. On the other hand, the light emitted from a liquid crystal display panel 32, which will be described later, passes through the polarizing plate 16 since the polarization direction is aligned to the polarizing plate. The polarizing plate 16 is not particularly limited as long as the above-described function is exhibited, and a known polarizing plate can be appropriately used.

The protective layer 18 is provided for protecting the conductive film 12, the first λ/4 plate 14, and the polarizing plate 16. The configuration of the protective layer 18 is not particularly limited. For example, glass, polycarbonate (PC), polyethylene terephthalate (PET), acrylic resin (PMMA), and the like can be used. The surface 18a of the protective layer 18 is, for example, a touch surface. In this case, a hard coat layer may be provided on the surface 18a as required.

The optically transparent layer 22 is provided for stably fixing each constituent of the touch panel module 10. The configuration of the optically transparent layer 22 is not particularly limited as long as the optically transparent layer is optically transparent, has insulation properties, and stably fixes each constituent. For the optically transparent layer 22, for example, an optically clear adhesive (OCA) and an optically clear resin (OCR) such as a UV curable resin, can be used. In addition, the optically transparent layer 22 may be formed to be partially hollow (have an air gap).

Here, the term "optically transparent" means that the light transmittance at a visible light wavelength (at a wavelength of 400 nm to 800 nm) is at least 60% or more, preferably 80% or more, more preferably 90% or more, and still more preferably 95% or more.

Next, the effect of the touch panel module 10 will be described.

In the touch panel module 10 of the embodiment, in the case in which incident light Li is incident to the surface 18a of the protective layer 18, first, only the light of the incident light Li, which is linearly polarized by the polarizing plate 16 in a specific direction, passes through the polarizing plate. Then, the light is changed to circularly polarized light by the first λ/4 plate 14, is incident to the conductive film 12, and is reflected by the mesh-like metal electrode of the conductive film 12 or the like. The reflected light Lr reflected by the conductive film 12 is changed to linearly polarized light by the first λ/4 plate 14 and reaches the polarizing plate 16. The linearly polarized light cannot pass through the polarizing plate 16 since the polarization direction of the polarizing plate 16 is shifted by π/2. Therefore, the reflected light Lr cannot be emitted to the outside. In this manner, it is possible to control the amount of light to be emitted to the outside even when the incident light Li is reflected by the conductive film 12 and the visibility of the mesh-like metal electrode of the conductive film 12 from the observation side is suppressed.

In the touch panel module 10, in the case in which the lamination order of the first λ/4 plate 14 and the polarizing plate 16 is reversed, emission of the reflected light Lr to the outside cannot be suppressed and the effect of suppressing the visibility of the mesh-like metal electrode of the conductive film 12 from the observation side is not obtained.

The touch panel module 10 is used in an electronic apparatus. For example, as shown in FIG. 1B, the touch panel is combined with the liquid crystal display panel 32 (liquid crystal display portion) to form an electronic apparatus 30. In this case, the touch panel module 10 is provided on a surface 32a of the liquid crystal display panel 32 through an optically transparent layer 34 while directing the protective layer 18 (refer to FIG. 1A) upward.

Since the optically transparent layer 34 has the same configuration as that of the optically transparent layer 22 of the touch panel module 10, the detailed description thereof will be omitted.

In the electronic apparatus 30, a detector 36 is connected to the touch panel module 10. A contact to the electronic apparatus 30 is detected in such a manner that a position where the electrostatic capacitance is changed by a touch with a finger or the like in the touch panel module 10 is detected by the detector 36. The detector 36 can be configured with a known detector used for detection for an electrostatic capacitive type touch panel.

Next, the effect of the electronic apparatus 30 will be described.

It is known that light Lb emitted from the surface 32a of the liquid crystal display panel 32 used in the electronic apparatus 30 is polarized. Regarding the light Lb polarized from the liquid crystal display panel 32, in the touch panel module 10 of the electronic apparatus 30, the light Lb emitted from the liquid crystal display panel 32 is circularly polarized by the first λ/4 plate 14 and the circularly polarized light passes through the conductive film 12, is further linearly polarized by the first λ/4 plate 14, and reaches the polarizing plate 16. When the polarization direction of the linearly polarized light reaching the polarizing plate 16 is aligned to the polarization direction of the polarizing plate 16, the light Lb from the liquid crystal display panel 32 passes through the polarizing plate 16 without being blocked by the polarizing plate, and light Lo is emitted from the surface 10a of the touch panel module 10 (the surface 18a of the protective layer 18) to the outside. Since the light Lo is emitted without being polarized by the polarizing plate 16, the attenuation of the amount of the light Lb from the liquid crystal display panel 32 is suppressed. Thus, a reduction in the amount of light of the liquid crystal display panel 32 is suppressed and the light Lb from the liquid crystal display panel 32 can be extracted to the outside. In addition, as described above, the reflected light by the conductive film 12 or the like is also suppressed and a high contrast ratio can be obtained.

As the electronic apparatus 30, a combination of the touch panel module 10 and the liquid crystal display panel 32 is mentioned as an example. However, the electronic apparatus 30 is not limited thereto. For example, the electronic apparatus 30 may employ a configuration of using an organic EL display panel instead of using the liquid crystal display panel 32. In the electronic apparatus 30, it is effective to use a display device in which the emitted light is polarized.

Next, the conductive film 12 will be described. The conductive film 12, which will be described below, is an example of a conductive film that can be used in the present invention and the present invention is not limited thereto.

FIG. 2A is a schematic cross-sectional view showing an example of a conductive film, and FIG. 2B is a schematic cross-sectional view showing another example of the conductive film. In FIGS. 2A and 2B, a part of the optically transparent layer 22 is omitted.

For example, as shown in FIG. 2A, the conductive film 12 has a first detection electrode 42 formed on a surface 40a of the support 40, and a second detection electrode 44 formed a rear surface 40b of the support 40. The first detection electrode 42 and the second detection electrode 44 are provided for detecting a change in electrostatic capacitance.

Figure 3A:
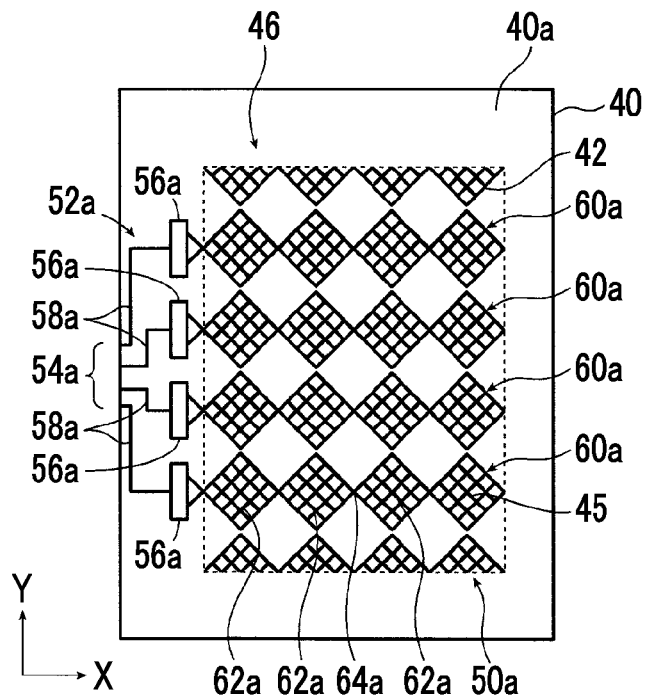
FIG. 3A is a schematic view showing an electrode pattern of a first detection electrode and FIG. 3B is a schematic view showing an electrode pattern of a second detection electrode.
Figure 3B:
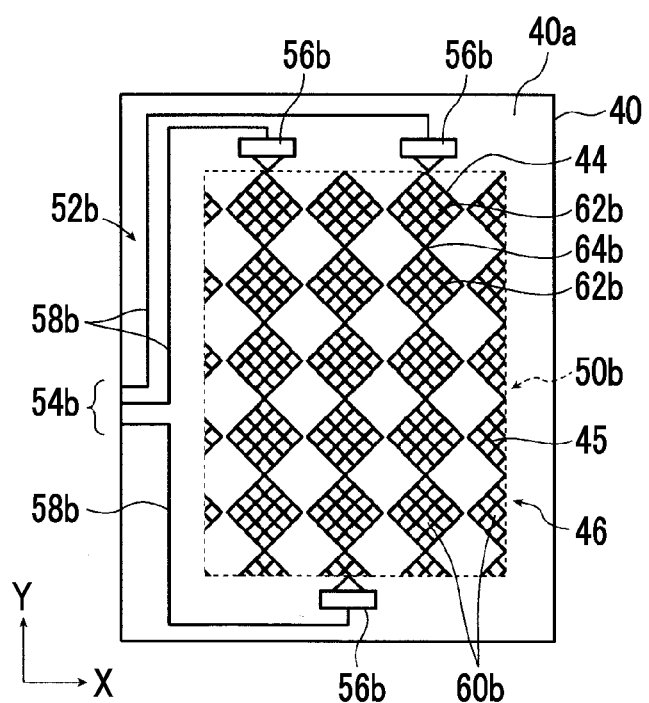

The first detection electrode 42 and the second detection electrode 44 are, for example, mesh-like metal electrodes having a mesh-like pattern and are composed of fine conductive wires 45 (refer to FIGS. 3A and 3B).

Mesh conductive layers 46 configured with the first detection electrode 42 and the second detection electrode 44 are formed on each surface of the respective supports 40.

As shown in FIG. 2A, it is effective to reduce a shift in the positional relationship between the first detection electrode 42 and the second detection electrode 44 by forming the detection electrodes on both surfaces of one support 40 when the support 40 expands or contracts. Although not shown in FIG. 2A, peripheral wiring is formed on each surface of the support 40 to contact the first detection electrode 42 and the second detection electrode 44 with the above-described detector 36 (refer to FIG. 1B).

The configuration of the conductive film 12 is not limited to the configuration shown in FIG. 2A. For example, as shown in FIG. 2B, the conductive film can be configured by laminating the support 40 having the first detection electrode 42 formed on the surface 40a and the support 40 having the second detection electrode 44 formed on the surface 40a. In this case, the support 40 having the second detection electrode 44 formed thereon is laminated on the rear surface 40b of the support 40 having the first detection electrode 42 formed thereon though the optically transparent layer 22.

The first detection electrode 42 and the second detection electrode 44 are separated from each other on the supports 40 in FIGS. 2A and 2B but are arranged to be perpendicular to each other in a plan view.

Regarding the fine conductive wires 45 (refer to FIGS. 3A and 3B) configuring the first detection electrode 42 and the second detection electrode 44, it is preferable that the line width d of the fine conductive wire 45 (refer to FIGS. 2A and 2B) is made narrow as much as possible in order to reduce visibility and moiré formed when being arranged in a display device. From this viewpoint, the line width d of the fine conductive wire 45 of the first detection electrode 42 and the second detection electrode 44 is preferably less than 10 µm and more preferably 5 µm or less.

However, when the line width d of the fine conductive wire 45 is too narrow, the disconnection is likely to occur during the process. Thus, the line width d of the fine conductive wire 45 is preferably 0.5 µm or more and more preferably 1 µm or more.

The thickness of the fine conductive wire 45 is preferably 0.1 µm or more from the viewpoint of the resistance value. However, when the thickness of the fine conductive wire is too thick, adhesiveness with an adhesive layer, which will be described later, becomes poor and thus the thickness of the fine conductive wire is preferably 10 µm or less.

The fine conductive wire 45 is formed of metal and for examples, a metal such as gold, silver, copper or aluminum, or alloys thereof may be used. Among these, from the viewpoint of the resistance value, silver and a silver alloy are preferable. In addition, when the fine conductive wire 45 includes a binder, bending processing is easily performed and the bending resistance is improved. Therefore, it is preferable that the fine conductive wire 45 is formed by incorporating a binder into these materials. As the binder, binders used for wiring for a conductive film can be appropriately used and for example, gelatin, polyvinyl alcohol (PVA) and the like disclosed in JP2013-12604A can be used.

By forming the first detection electrode 42 and the second detection electrode 44 using a mesh-like metal electrode composed of the fine conductive wires 45 made of a metal or an alloy, the resistance of the detection electrodes can be reduced and the detection sensitivity of the touch panel can be improved. In addition, the mesh-like metal electrode has the effect of suppressing the disconnection of the detection electrodes and an increase in resistance with respect to expansion and contraction of the support 40.

In the touch panel module 10, since the fine conductive wire 45 made of a metal or an alloy is used, the resistance can be reduced compared to the case of using a transparent conductive material such as ITO. Therefore, a touch panel module 10 with low resistance can be obtained.

The mesh shape of the mesh-like metal electrode may be a typical shape in which the same shapes are regularly arranged or may be a random shape. In the case of a typical shape, a square shape, a diamond shape, and a regular hexagon shape are preferable and a diamond shape is particularly preferable. In the case of a diamond shape, the angle of the acute angle thereof is 50 degrees to 80 degrees, which is preferable from the viewpoint of reducing moiré with a display device. The mesh pitch is 50 µm to 600 µm, and the opening ratio of the mesh is preferably 92% to 99%. The opening ratio of the mesh is defined by a ratio of the non-occupancy area of the fine conductive wire in the mesh portion.

As the mesh-like metal electrode, for example, mesh-like metal electrodes disclosed in JP2011-129501A and JP2013-149236A can be used. In addition to these mesh-like metal electrodes, for example, a detection electrode used in an electrostatic capacitive type touch panel can be appropriately used.

The method of forming the first detection electrode 42, the second detection electrode 44, and the peripheral wiring is not particularly limited. For example, as described in paragraphs "0067" to "0083" of JP2012-185813A, the electrodes and wiring can be formed by exposing a photosensitive material having a photosensitive halogenated silver halide-containing emulsion layer and subjecting the material to a development treatment. In addition, the first detection electrode 42, the second detection electrode 44, and the peripheral wiring can be formed by respectively forming metal foils on the surface 40a and the rear surface 40b of the support 40 and printing a resist on each metal foil in a pattern shape or exposing a resist applied to the entire surface and developing the resist to form a pattern, and etching the metal of the opening portion to form peripheral wiring. Other than the above method, examples of the method of forming the first detection electrode 42, the second detection electrode 44, and the peripheral wiring include a method of printing a paste including fine particles of the material constituting the above-described conductor and plating the paste with a metal, and a method of using an ink jet method using an ink including fine particles of the material constituting the above-described conductor, a method of forming an ink including fine particles of the material constituting the above-described conductor by screen printing, a method of forming a resin with a groove on a substrate and applying a conductive ink to the groove, and a microcontact printing patterning method.

The support 40 supports the first detection electrode 42 and the second detection electrode 44 and is composed of an electrical insulating material.

For the support 40, for example, a plastic film, a plastic plate, glass or the like can be used. A plastic film and a plastic substrate can be composed of for example, polyesters such as polyethylene terephthalate (PET), and polyethylene naphthalate (PEN), polyolefins such as polyethylene (PE), polypropylene (PP), polystyrene, ethylene vinyl acetate (EVA), a cycloolefin polymer (COP), and a cycloolefin copolymer (COC), vinyl resins, in addition to polycarbonate (PC), polyamide, polyimide, acrylic resin, and triacetyl cellulose (TAC).

In the embodiment, the support 40 of the conductive film 12 preferably has a retardation value of 40 nm or less and more preferably has a retardation value of 20 nm or less at a wavelength of 550 nm in an in-plane direction.

For example, in the case of constituting the support 40 with PET, the retardation value is 100 nm or more. In the case in which the retardation value is as large as more than 40 nm, the polarization effect is attenuated, the visible light diffuse reflectivity increases, and the visibility of the mesh-like metal electrode increases. Thus, there is a possibility of deterioration in line visibility.

The above-described materials may be used for the support 40. As a cycloolefin polymer (COP) used for the support 40, ARTON ((registered trademark: ARTON) manufactured by JSR Corporation) may be used and a cycloolefin copolymer, TOPAS ((registered trademark: TOPAS) manufactured by ADVANCED POLYMERS GmbH) may be used. Both ARTON and TOPAS have a low retardation value of about 5 nm to 10 nm. From this viewpoint, it is more preferable to use ARTON and TOPAS for the support 40.

The retardation value of the support 40 at a wavelength of 550 nm in the in-plane direction is a value calculated by $(nx-ny) \times t$ when a refractive index of the support 40 in an in-plane slow axis direction is nx, a refractive index of the support 40 in an in-plane fast axis direction is ny, and the thickens of the support 40 is t.

The in-plane retardation value of the support 40 is measured at a measurement wavelength of 550 nm using, for example, a low retardation measurement device (Model RE-100) manufactured by Otsuka Electronics Co., Ltd.

Regarding the retardation value in the case in which plural supports 40 are present, a total of retardation values of each layer is preferably 40 nm or less and more preferably 20 nm or less.

Next, the first detection electrode 42 and the second detection electrode 44 will be described in detail using FIGS. 3A to 4. The first detection electrode 42 and the second detection electrode 44, which are described below, are examples of the detection electrodes that can be used in the present invention and the present invention is not limited thereto.

FIG. 3A is a schematic view showing an electrode pattern of a first detection electrode, and FIG. 3B a schematic view showing an electrode pattern of a second detection electrode. FIG. 4 is a schematic view showing a mesh-like metal electrode of a conductive film of an embodiment of the present invention.

As shown in FIG. 3A, for example, the first detection electrode 42 is arranged in a first sensor portion 50a to be arranged in a display region of a display device. A first terminal wiring portion 52a that is connected to the first sensor portion 50a is provided in an outer peripheral region of the display region, that is, a so-called frame.

The first sensor portion 50a has, for example, a rectangular shape. At the center portion of a peripheral edge portion in the length direction thereof on one side of the first terminal wiring portion 52a extending parallel with a second direction Y, plural first terminals 54a are arranged and formed so as to be parallel with the second direction Y. Along one side of the first sensor portion 50a, that is, along a side extending parallel with the second direction Y, plural first wire connection portions 56a are arranged nearly in a line. First terminal wiring patterns 58a led from each of the first wire connection portions 56a are routed toward the first terminals 54a and are electrically connected to the corresponding first terminals 54a, respectively. The first terminals 54a are connected to, for example, the detector 36 (refer to FIG. 1B) of the above-described electronic apparatus 30 (refer to FIG. 1B). The first terminal wiring portion 52a, the first terminals 54a, the first wire connection portions 56a, and the first terminal wiring patterns 58a are collectively called peripheral wiring.

In the first sensor portion 50a, the first detection electrode 42 is arranged as a first conductive pattern 60a (mesh pattern) in which the fine conductive wires 45 cross in a diamond pattern shape. The diamond patterns of the first conductive patterns 60a respectively extend in a first direction X and are arranged in the second direction Y perpendicular to the first direction X. In addition, in each of the first conductive patterns 60a, two or more first large lattices 62a are connected in series in the first direction X. Between adjacent first large lattices 62a, a first connection portion 64a for electrically connecting these first large lattices 62a is formed.

On one end portion side of each of the first conductive patterns 60a, the first wire connection portions 56a are not formed at the open ends of the first large lattices 62a. On the other end portion side of each of the first conductive patterns 60a, the first wire connection portions 56a are respectively provided at the end portions of the first large lattices 62a. Then, each of the first conductive patterns 60a is electrically connected to the first terminal wiring patterns 58a through each of the first wire connection portions 56a.

As shown in FIG. 3B, for example, the second detection electrode 44 is arranged in a second sensor portion 50b to be arranged on the display region of a display device. A second terminal wiring portion 52b that is connected to the second sensor portion 50b is provided in an outer peripheral region of the display region, that is, a frame.

The second sensor portion 50b is stacked and arranged on the first sensor portion 50a and has a rectangular shape. The first sensor portion 50a and the second sensor portion 50b are arranged to cross in a plan view.

At the center portion of the peripheral edge portion in the length direction thereof on one side of the second terminal wiring portion 52b extending parallel with the second direction Y, plural second terminals 54b are arranged and formed in the second direction Y. Along one side of the second sensor portion 50b, that is, along a side extending parallel with the first direction X, plural second wire connection portions 56b, for example, odd-numbered second wire connection portions 56b are arranged nearly in a line. Along the other side of the second sensor portion 50b, that is, along a side opposite to one side, plural second wire connection portions 56b, for example, even-numbered second wire connection portions 56b are arranged nearly in a line. Second terminal wiring patterns 58b led out from each of the second wire connection portions 56b are routed toward second terminals 54b and electrically connected to the corresponding second terminals 54b respectively. The second terminal wiring portion 52b, the second terminals 54b, the second wire connection portions 56b, and the second terminal wiring patterns 58b are collectively called peripheral wiring.

In the second sensor portion 50b, the second detection electrode 44 is arranged as second conductive patterns 60b (mesh patterns) in which the fine conductive wires 45 cross in a diamond pattern shape. The second conductive patterns 60b respectively extend in the second direction Y and are arranged in the first direction X perpendicular to the second direction Y. In addition, in each of the second conductive patterns 60b, two or more second large lattices 62b are connected in series in the second direction Y. Between adjacent second large lattices 62*b*, a second connection portion 64*b* for electrically connecting these second large lattices 62*b* is formed.

On one end portion side of each of the second conductive patterns 60*b*, the second wire connection portions 56*b* are not formed at the open ends of the second large lattices 62*b*. On the other end portion side of each of the second conductive patterns 60*b*, the second wire connection portions 56*b* are respectively provided at the end portions of the second large lattices 62*b*. Then, each of the second conductive patterns 60*b* is electrically connected to the second terminal wiring patterns 58*b* through each of the second wire connection portions 56*b*.

Figure 4:
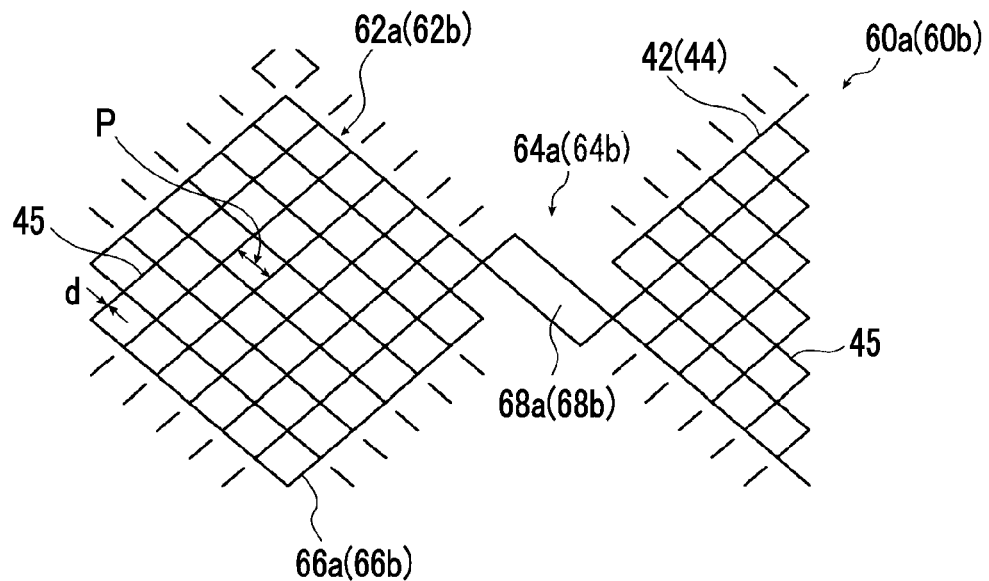
FIG. 4 is a schematic view showing a mesh-like metal electrode of a conductive film of the embodiment of the present invention.

As shown in FIG. 4, in the first conductive pattern 60*a*, each of the first large lattices 62*a* is configured by combining two or more first small lattices 66*a*, respectively. The shape of the first small lattice 66*a* is the smallest diamond herein. The first connection portion 64*a* for connecting adjacent first large lattices 62*a* has an area equal to or larger than the area of the first small lattice 66*a* and is composed of a first middle lattice 68*a* having an area smaller than the area of the first large lattice 62*a*.

Since the second conductive pattern 60*b* has the same configuration as the first conductive pattern 60*a*, the description thereof will be made using FIG. 4 in the same manner. In the second conductive pattern 60*b*, each of the second large lattices 62*b* is configured by combining two or more second small lattices 66*b*, respectively. The shape of the second small lattice 66*b* is the smallest diamond shape and is the same as or similar to the aforementioned one mesh shape. The second connection portion 64*b* for connecting adjacent second large lattices 62*b* has an area equal to or larger than the area of the second small lattice 66*b* and is composed of a second middle lattice 68*b* having an area smaller than the second large lattice 62*b*.

As described above, regarding the conductive film 12, an electrostatic capacitive type conductive film having a configuration in which detection electrodes are arranged through an electrical insulating material such as the support 40 has been described as an example, but the present invention is not limited to the electrostatic capacitive type conductive film. Regarding the conductive film 12, for example, a conducive film having a configuration in which an insulation film is provided only at the cross section in an electrode, and connection is made through bridge wiring formed on the insulation film as disclosed in JP2010-16067A or the like, and a conductive film having a configuration in which a detection electrode is provided only on one side of a substrate like an electrode configuration not having a cross portion disclosed in US20120262414B or the like may be used.

The present invention is basically configured as described above. The touch panel module and the electronic apparatus of the present invention have been described above in detail. However, the present invention is not limited to the above embodiments and it is needless to say that various improvements or modifications may be made within a range not departing from the gist of the present invention.

EXAMPLES

Hereinafter, the effect of the touch panel module of the present invention will be described in detail.

In the examples, touch panel modules of Examples 1 to 6 and Comparative Examples 1 to 5 were prepared, and the visible light diffuse reflectivity and L* thereof were measured. Further, the line visibility was evaluated. Regarding migration, samples prepared by changing an exposure pattern to a migration test pattern described later were evaluated.

The touch panel modules of Examples 1 to 6 have the same configuration as that of the touch panel module shown in FIG. 1A, and thus the detailed description thereof will be omitted. The touch panel modules of Comparative Examples 1 to 5 have the same configuration as that of a touch panel module 70 shown in FIG. 5. In the touch panel module 70 shown in FIG. 5, the first λ/4 plate 14, the polarizing plate 16, and the second λ/4 plate 20 are not provided, the protective layer 18 is provided on the conductive film 12 through the optically transparent layer 22, and a protective film 72 is provided below the conductive film 12 through the optically transparent layer 22, compared to the touch panel module 10 shown in FIG. 1A.

Figure 5:
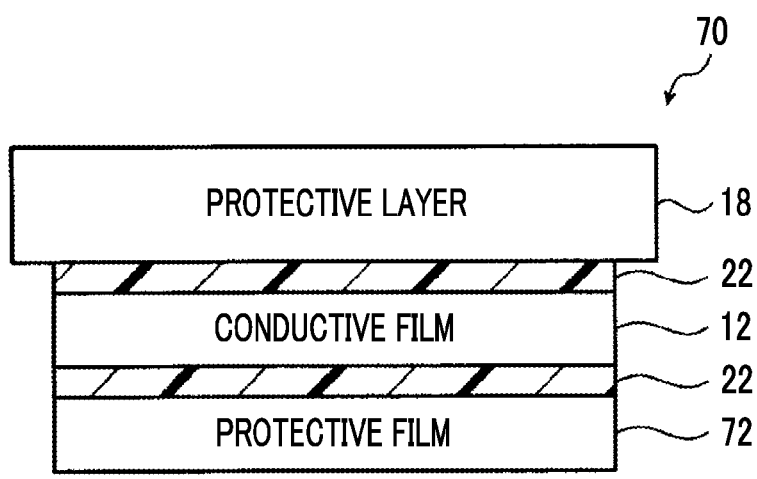
FIG. 5 is a schematic view showing the configuration of touch panel modules of Comparative Examples 1 to 5.

In Table 1 below, in the column of "layer configuration", the configuration shown in FIG. 1A is expressed as "polarizing plate+λ/4 plate", and the configuration shown in FIG. 5 is expressed as "typical configuration". In addition, in Table 1 below, "-" means no configuration.

Figure 6A:
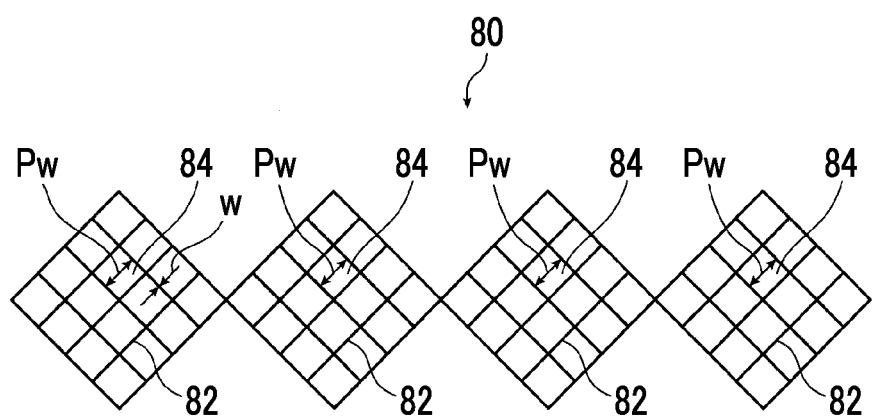
FIG. 6A is a schematic view showing an exposure pattern used in Examples 1 to 6 and Comparative Examples 1 to 5.

Further, in the touch panel modules of Examples 1 to 6 and Comparative Examples 1 to 5, for the pattern of the mesh-like metal electrode, an exposure pattern 80 shown in FIG. 6A was used. In FIG. 6A, only a part of the exposure pattern 80 is shown.

The exposure pattern 80 is formed of diamond patterns being connected in one direction and also arranged in a direction perpendicular to one direction although not shown in the drawing. In the exposure pattern 80, diamond-shaped meshes 84 (acute angle: 90 degrees) are composed of fine wire patterns 82. The mesh pitch Pw refers to a distance between sides of the diamond-shaped meshes 84 facing each other. The mesh pitch shown in Table 1 below is the mesh pitch Pw shown in FIG. 6A. The line width shown in Table 1 below is the width d of the fine conductive wire 45 and is a width w of the fine wire pattern 82 in the case of the exposure pattern 80. During exposure, the mesh pitch Pw and the width w of the exposure pattern 80 were adjusted to have values of the mesh pitch and the line width shown in Table 1 below.

Figure 6B:
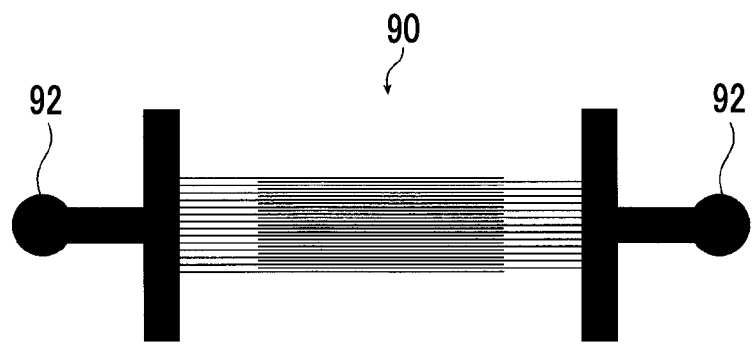
FIG. 6B is a schematic view showing a migration test pattern used for evaluation of migration.

The migration evaluation was carried out using a migration test pattern 90 shown in FIG. 6B. The migration test pattern 90 is a pattern according to IPC-TM 650 or SM 840, and has a line width of 50 μm, a space width of 50 μm, and the number of lines of 17/18. The migration test pattern 90 itself is also referred to as a comb-shaped pattern electrode. For the migration evaluation, in addition to the comb-shaped pattern electrode, samples having the same configuration as those of the touch panel modules of Examples 1 to 6 and Comparative Examples 1 to 5 were used.

In Examples 1 to 6, a cycloolefin polymer (ARTON (registered trademark)) was used for the support of the conductive film. The thickness of all the supports is 40 μm.

In the touch panel modules of Examples 1 to 6 and Comparative Examples 1 to 5, glass having a thickness of 700 μm was used for the protective layer. A triacetyl cellulose (TAC) film including a polarizing layer having a thickness of 100 μm was used for the polarizing plate.

In the touch panel modules of Comparative Examples 1 to 4, TAC having a thickness of 50 μm was used for the protective film 72. In the touch panel module of Comparative Example 5, a cycloolefin polymer (ARTON (registered trademark)) having a thickness of 40 μm was used for the protective film 72.

In the touch panel modules of Examples 1 to 6, the same material was used for the first λ/4 plate and the second λ/4 plate. The materials for the first λ/4 plate and the second λ/4 plate are shown in Table 1. In Table 1, TAC indicates a λ/4 plate of TAC (triacetyl cellulose) manufactured by Fujifilm Corporation. PC (polycarbonate) indicates a λ/4 plate of PURE ACE (registered trademark) TT-138 manufactured by TEIJIN LIMITED. COP (cycloolefin polymer) indicates a λ/4 plate of ARTON (registered trademark) manufactured by manufactured by JSR Corporation.

The thickness of both the first λ/4 plate and the second λ/4 plate is 50 μm.

For the optically transparent layer 22, a layer formed using MGSF series manufactured by KGK Kyodo Giken Chemical Co., Ltd. having a thickness of 50 μm was used.

Hereinafter, the method of preparing the conductive film will be described.

(Preparation of Silver Halide Emulsion)

To Solution 1 which was held at 38° C. and pH 4.5, Solutions 2 and 3 (amounts corresponding to 90% of the respective solution amounts) were added simultaneously for 20 minutes with being stirred. In this manner, nucleus particles having a size of 0.16 μm were formed. Subsequently, Solutions 4 and 5 below were added thereto for 8 minutes, and the rests of Solutions 2 and 3 (amounts corresponding to 10% of the respective solution amounts) were further added thereto for 2 minutes so as to cause the particles to grow up to 0.21 vim in size. Furthermore, 0.15 g of potassium iodide was added thereto, and the resultant was aged for 5 minutes to end the formation of the particles.

Solution 1:

| Water | 750 ml |
| Gelatin | 9 g |
| Sodium chloride | 3 g |
| 1,3-dimethylimidazolidine-2-thione | 20 mg |
| Sodium benzene thiosulfonate | 10 mg |
| Citric acid | 0.7 g |

Solution 2:

| Water | 300 ml |
| Silver nitrate | 150 g |

Solution 3:

| Water | 300 ml |
| Sodium chloride | 38 g |
| Potassium bromide | 32 g |
| Potassium hexachloroiridate(III) hydrate (0.005% in 20% aqueous KCl solution) | 8 ml |
| Ammonium hexachlororhodate (0.001% in 20% aqueous NaCl solution) | 10 ml |

Solution 4:

| Water | 100 ml |
| Silver nitrate | 50 g |

Solution 5:

| Water | 100 ml |
| Sodium chloride | 13 g |
| Potassium bromide | 11 g |
| Yellow prussiate of potash | 5 mg |

Thereafter, water washing by the flocculation method according to the typical method was conducted. Specifically, the temperature was lowered to 35° C., and the pH was reduced using sulfuric acid until silver halide precipitated (precipitation occurred in the pH range of 3.6±0.2). Next, about 3 L of the supernatant was removed (first water washing). Further, 3 L of distilled water was added to the mixture, and sulfuric acid was added until silver halide precipitated. 3 L of the supernatant was removed again (second water washing). The procedure same as the second water washing was repeated once more (third water washing), and water-washing and desalting steps were thus completed. The pH and the pAg of the emulsion after washing and desalting were adjusted to 6.4 and 7.5, respectively, and 3.9 g of gelatin, 10 mg of sodium benzene thiosulfonate, 3 mg of sodium benzene thiosulfinate, 15 mg, of sodium thiosulfate, and 10 mg of chloruaric acid were added, followed by applying the chemical sensitization at 55° C. so as to obtain the optimum sensitivity. Thereto, 100 mg of 1,3,3a,7-tetrazaindene as a stabilizing agent, and 100 mg of PROXEL (trade name, manufactured by ICI Co., Ltd.) as an antiseptic were added. Finally, an emulsion of cubic silver iodochlorobromide particles containing 0.08% by mole of silver iodide, 70% by mole of silver chloride and 30% by mole of silver bromide at a ratio of silver chloride and silver bromide, and having an average particle diameter of 0.22 μm and a coefficient of variation of 9% was obtained.

(Preparation of Photosensitive Layer Forming Composition)

To the above emulsion, $1.2 \times 10^{-4}$ mole/mole Ag of 1,3,3a,7-tetrazaindene, $1.2 \times 10^{-2}$ mole/mole Ag of hydroquinone, $3.0 \times 10^{-4}$ mole/mole Ag of citric acid, and 0.90 g/mole Ag of 2,4-dichloro-6-hydroxy-1,3,5-triazine sodium salt were added, followed by adjusting the pH of the coating solutions so as to be 5.6 using citric acid. Thus, a photosensitive layer forming composition was obtained.

(Photosensitive Layer Forming Process)

After the support was subjected to a corona discharge treatment, gelatin layers having a thickness of 0.1 μm were provided on both surfaces of the support as under layers, and further an antihalation layer including a dye discolored by alkali of a developing solution with an optical density of about 1.0 was provided on the underlayer. The photosensitive layer forming composition was applied to the antihalation layer and further a gelatin layer having a thickness of 0.15 μm was provided to obtain a support having photosensitive layers formed on both surfaces. The support having photosensitive layers formed on both surfaces is set to Film A. In the formed photosensitive layer, the amount of silver was 6.0 g/m² and the amount of gelatin was 1.0 g/m².

(Exposure Development Process)

Film A was exposed to parallel light from a high-pressure mercury lamp as a light source through a photomask such that the above-described electrode patterns of FIG. 6A were perpendicular to the both surfaces of Film A. After the exposure, the film was developed with the following developing solution and further a development treatment was carried out using a fixing solution (product name: N3X-R for CN16X, manufactured by Fujifilm Corporation). Furthermore, the film was rinsed with pure water and dried. Thus, a support in which an electrode pattern formed of fine Ag wires and a gelatin layer were formed on the both surfaces was obtained. The gelatin layer was formed between the fine Ag wires. The obtained film is set to Film B.

(Composition of Developing Solution)

1 L of a developing solution includes the following compounds.

| | |
|---|---|
| Hydroquinone | 0.037 mol/L |
| N-methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

(Heating Process)

Film B above was left to stand in a superheated-steam tank at 120° C. for 130 seconds and subjected to a heating treatment. The film after the heating treatment is set to Film C.

(Gelatin Decomposition Treatment)

Film C was immersed in an aqueous solution of protease (BIOPRASE AL-15FG manufactured by Nagase ChemteX Corporation) (concentration of protease: 0.5% by mass, liquid temperature: 40° C.) for 120 seconds. Film C was taken out from the aqueous solution, immersed in the aqueous solution at warm water (liquid temperature: 50° C.) for 120 seconds, and then washed with water. The film after the gelatin decomposition treatment is set to Film D. Film D is a conductive film.

(Touch Panel Module Forming Process)

Further, for the conductive film, an optically transparent layer (MGSF series manufactured by manufactured by KGK Kyodo Giken Chemical Co., Ltd) having a thickness of 50 μm was used and the first λ/4 plate, the polarizing plate, the protective layer, and the second λ/4 plate were laminated according to each configuration of Examples 1 to 6 and Comparative Examples 1 to 5 to obtain touch panel modules.

Samples of Examples 1 to 6 and Comparative Examples 1 to 5 for migration evaluation were prepared in the same manner as in the preparation of the above-described touch panel module except that one surface of the support was exposed with the migration test pattern 90 shown in FIG. 6B. Therefore, the details of the preparation method will be omitted.

(Visible Light Diffuse Reflectivity)

Regarding the touch panel modules of Examples 1 to 6 and Comparative Examples 1 to 5, the diffuse reflectivity of the surface of the protective layer at 380 nm to 780 nm was measured using a V-670 ultraviolet-visible near infrared spectrophotometer (manufactured by JASCO Corporation). Then, the diffuse reflectivity obtained by measurement and the high price coefficient in Table 1.1 (high price coefficient for calculating visible light transmittance) of JIS A5759: 2008 were multiplied, and weighted averaging was applied to the obtained value. Thus, the visible light diffuse reflectivity was obtained.

(Measurement of L*)

Regarding the touch panel modules of Examples 1 to 6 and Comparative Examples 1 to 5, L* of the surface of the protective layer was measured using a spectrophotometer SPECTROEYE (product name, manufactured by SAKATA INX ENG. CO., LTD.).

(Equilibrium Moisture Content of λ/4 Plate)

The equilibrium moisture content of the first λ/4 plate and the second λ/4 plate was measured using the Karl-Fischer method. The moisture was adjusted in an environment of a temperature of 25° C. and a relative humidity of 80% for 24 hours and the base was hydrated. Thereafter, the absolute dry weight thereof was measured by the Karl-Fischer method to obtain the equilibrium moisture content.

(Equilibrium Moisture Content of Protective Film)

The equilibrium moisture content of the protective film was measured in the same manner as in the measurement of the equilibrium moisture content of the first λ/4 plate and the second λ/4 plate, and the above Karl-Fischer method was used for the measurement. Therefore, the details of the measurement method of the equilibrium moisture content of the protective film will be omitted.

(Evaluation of Line Visibility)

Regarding the touch panel modules of Examples 1 to 6 and Comparative Examples 1 to 5, line visibility was observed under a sunlight light source and evaluated with evaluation points based on the following evaluation criteria. Evaluations A, B, and C are within a practicable range.

Evaluation Point

"A": Lines (mesh-like metal electrode) are invisible.

"B": Lines (mesh-like metal electrode) are rarely visible.

"C": Lines (mesh-like metal electrode) are slightly visible.

"D": Lines (mesh-like metal electrode) are clearly visible.

(Migration Evaluation)

The samples of Examples 1 to 6 and Comparative Examples 1 to 5 for migration evaluation were left to stand in an atmosphere of a temperature of 85° C. and a relative humidity of 85%. Then, wiring was connected to both end portions 92 of the samples of Examples 1 to 6 and Comparative Examples 1 to 5 for migration evaluation (refer to FIG. 6B) and a direct current of 5 V was continuously applied from one surface thereof. After a predetermined period of time had passed, the samples were taken out from the atmosphere of a temperature of 85° C. and a relative humidity of 85%, and a voltage of a direct current of 5 V was applied using R8340A manufactured by Advantest to measure the insulation resistance. Thereafter, migration was evaluated according to the evaluation criteria. Evaluations A, B, and C are within a practicable range.

"A": A case in which the insulation resistance value was lowered to $10^{10}\Omega$ or more for a period of 500 hours or longer "B": A case in which the insulation resistance value was lowered to less than $10^{10}\Omega$ for a period of 200 hours or longer and shorter than 500 hours "C": A case in which the insulation resistance value was lowered to less than $10^{10}\Omega$ for a period of 50 hours and longer and shorter than 200 hours "D": A case in which the insulation resistance value was lowered to less than $10^{10}\Omega$ for a period shorter than 50 hours

TABLE 1

| | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|
| Line width (μin) | 5 | 5 | 3 | 3 | 5 | 5 | 5 | 5 | 3 | 3 | 5 |
| Mesh pitch (μm) | 175 | 350 | 175 | 350 | 175 | 175 | 175 | 350 | 175 | 350 | 175 |
| Layer configuration | Polarizing plate + λ/4 plate | Polarizing plate + λ/4 plate | Polarizing plate + λ/4 plate | Polarizing plate + λ/4 plate | Polarizing plate + λ/4 plate | Polarizing plate + λ/4 plate | Typical configuration | Typical configuration | Typical configuration | Typical configuration | Typical configuration |

TABLE 1-continued

| | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|
| Support of mesh conductive layer | ARTON | ARTON | ARTON | ARTON | ARTON | ARTON | ARTON | ARTON | ARTON | ARTON | ARTON |
| Retardation of support of mesh conductive layer (nm) | 2 | 2 | 2 | 2 | 2 | 2 | 2 | 2 | 2 | 2 | 2 |
| Material for λ/4 plate | TAC | TAC | TAC | TAC | PC | COP | — | — | — | — | — |
| Material for protective film | — | — | — | — | — | — | TAC | TAC | TAC | TAC | COP |
| Visible light diffuse reflectivity (%) | 0.12 | 0.09 | 0.12 | 0.10 | 0.12 | 0.12 | 0.80 | 0.30 | 0.36 | 0.29 | 0.79 |
| L* | 0.96 | 0.59 | 0.76 | 0.62 | 0.96 | 0.96 | 4.89 | 2.58 | 3.74 | 2.27 | 4.83 |
| Equilibrium moisture content of λ/4 plate (%) | 3.0 | 3.0 | 3.0 | 3.0 | 0.4 | 0.2 | — | — | — | — | — |
| Equilibrium moisture content of Protective film (%) | — | — | — | — | — | — | 3.0 | 3.0 | 3.0 | 3.0 | 0.2 |
| Line visibility | A | A | A | A | A | A | C | D | C | C | C |
| Migration | C | C | C | C | A | A | C | C | C | C | B |

As shown in Table 1 above, in all Examples 1 to 6, the line visibility can be highly evaluated and the visibility of the mesh-like metal electrode is low. In Examples 1 to 6, in the case in which the equilibrium moisture content of the λ/4 plate is 2% or less, the evaluation for migration is high even when the λ/4 plate is provided.

On the other hand, in Comparative Examples 1 to 5, the line visibility cannot be highly evaluated and the visibility of the mesh-like metal electrode is high.

Incidentally, since the touch panel module 70 of Comparative Example 5 has a configuration in which the equilibrium moisture content of the protective film is 2% or less, the evaluation result for migration is good but the line visibility cannot be highly evaluated as described above.

EXPLANATION OF REFERENCES

10, 70: touch panel module
12: conductive film
14: first λ/4 plate
16: polarizing plate
18: protective layer
20: second λ/4 plate
22, 34: optically transparent layer
30: electronic apparatus
32: liquid crystal display panel
36: detector
40: support
42: first detection electrode
44: second detection electrode
45: fine conductive wire
46: mesh conductive layer
80: exposure pattern
90: migration test pattern

What is claimed is:

1. A touch panel module, comprising:
   wherein a conductive film in which a mesh conductive layer composed of a mesh-like metal electrode is formed on a support, a first λ/4 plate, a polarizing plate, and a protective layer are arranged in this order,
   a second λ/4 plate is further arranged on a side of the conductive film opposite to the protective layer,
   a visible light diffuse reflectivity measured from the protective layer is 0.09% or more and 0.2% or less, and
   the support has a retardation value of 40 nm or less at a wavelength of 550 nm in an in-plane direction.

2. The touch panel module according to claim 1,
   wherein L* of a surface of the protective layer is 0.59 or more and 2 or less, and
   L* is a value of L* in a color space according to International Commission on Illumination in 1976 (CIE 1976) L*a*b*.

3. The touch panel module according to claim 2,
   wherein an equilibrium moisture content of the first λ/4 plate and the second λ/4 plate is equal to or between 0.2% and 2%.

4. An electronic apparatus comprising:
   the touch panel module according to claim 3.

5. An electronic apparatus comprising:
   the touch panel module according to claim 3.

6. An electronic apparatus
   wherein the touch panel module according to claim 3 is arranged on a liquid crystal display portion.

7. An electronic apparatus
   wherein the touch panel module according to claim 3 is arranged on a liquid crystal display portion.

8. An electronic apparatus comprising:
   the touch panel module according to claim 2.

9. An electronic apparatus
wherein the touch panel module according to claim 2 is arranged on a liquid crystal display portion.

10. The touch panel module according to claim 1, wherein an equilibrium moisture content of the first $\lambda/4$ plate and the second $\Delta/4$ plate is equal to or between 0.2% and 2%.

11. An electronic apparatus comprising:
the touch panel module according to claim 10.

12. An electronic apparatus
wherein the touch panel module according to claim 10 is arranged on a liquid crystal display portion.

13. An electronic apparatus comprising:
the touch panel module according to claim 1.

14. An electronic apparatus comprising:
the touch panel module according to claim 1.

15. An electronic apparatus
wherein the touch panel module according to claim 1 is arranged on a liquid crystal display portion.

16. An electronic apparatus
wherein the touch panel module according to claim 1 is arranged on a liquid crystal display portion.

17. A touch panel module, comprising:
wherein a conductive film in which a mesh conductive layer composed of a mesh-like metal electrode is formed on a support, a first $\lambda/4$ plate, a polarizing plate, and a protective layer are arranged in this order,
a second $\lambda/4$ plate is further arranged on a side of the conductive film opposite to the protective layer,
a visible light diffuse reflectivity measured from the protective layer is 0.09% or more and 0.2% or less, and
an equilibrium moisture content of the first $\lambda/4$ plate and the second $\lambda/4$ plate is equal to or between 0.2% and 2%.

* * * * *